(12) United States Patent  
Ely

(10) Patent No.: US 8,938,365 B2  
(45) Date of Patent: Jan. 20, 2015

(54) CLOCK FAULT DETECTOR

(75) Inventor: Richard J. Ely, Sudbury, MA (US)

(73) Assignee: Avaya Inc., Basking Ridge, NJ (US)

( * ) Notice: Subject to any disclaimer, the term of this patent is extended or adjusted under 35 U.S.C. 154(b) by 466 days.

(21) Appl. No.: 13/355,978

(22) Filed: Jan. 23, 2012

(65) Prior Publication Data

US 2013/0191065 A1 Jul. 25, 2013

(51) Int. Cl.
  G06F 19/00 (2011.01)
  G01R 31/00 (2006.01)
  G06F 1/04 (2006.01)
  G06F 11/07 (2006.01)

(52) U.S. Cl.
  CPC ............... G06F 1/04 (2013.01); G06F 11/079 (2013.01); G06F 11/0736 (2013.01)
  USPC .............................. 702/117; 327/20; 327/151

(58) Field of Classification Search
  CPC ...... G06F 11/0736; G06F 11/079; G06F 1/04
  USPC ................... 702/46, 58, 78, 79, 89, 117, 185; 327/20, 151, 158; 331/10; 375/373, 375/376
  See application file for complete search history.

(56) References Cited

U.S. PATENT DOCUMENTS

| 7,157,948 | B2 * | 1/2007 | McClannahan et al. ...... 327/151 |
| 7,924,061 | B2 * | 4/2011 | Guillot et al. .................. 327/20 |

OTHER PUBLICATIONS

Altium FRQCNT2 Frequency Counter, Core Reference CR0101 (v. 1.2), Dec. 12, 2005, http://www.altium.com/files/Altiumdesigner6/LearningGuides/CR0101%20FRQCNT2%20Frequency%20Counter.PDF.

* cited by examiner

Primary Examiner — John H Le  
(74) Attorney, Agent, or Firm — Anderson Gorecki & Rouille LLP

(57) ABSTRACT

A method and apparatus for providing clock fault detection is presented. A first clock of a plurality of clocks on a printed circuit board (PCB) is designated as a reference clock. A reference clock counter is in communication with the reference clock, counting cycles of the reference clock. A counter is provided for each other clock of the plurality of clocks, each counter counting cycles of a respective clock. The reference clock counter and each of the counters are started at a same time. When the reference clock counter reaches a maximum count value the value of each of the counters is stored and a determination is made whether the stored values are expected values.

17 Claims, 3 Drawing Sheets

THE DESIGNATING A FIRST CLOCK OF A PLURALITY OF CLOCKS AS A REFERENCE CLOCK, THE PROVIDING A REFERENCE CLOCK COUNTER, THE PROVIDING A COUNTER FOR EACH OTHER CLOCK OF THE PLURALITY OF CLOCKS, THE STARTING THE REFERENCE CLOCK COUNTER AND EACH OF THE COUNTERS AT A SAME TIME, AND THE DETERMINING WHEN THE REFERENCE CLOCK COUNTER REACHES A MAXIMUM COUNT VALUE ARE PERFORMED DURING MANUFACTURING TEST — 122

OR

THE DESIGNATING A FIRST CLOCK OF A PLURALITY OF CLOCKS AS A REFERENCE CLOCK, THE PROVIDING A REFERENCE CLOCK COUNTER, THE PROVIDING A COUNTER FOR EACH OTHER CLOCK OF THE PLURALITY OF CLOCKS, THE STARTING THE REFERENCE CLOCK COUNTER AND EACH OF THE COUNTERS AT A SAME TIME, AND THE DETERMINING WHEN THE REFERENCE CLOCK COUNTER REACHES A MAXIMUM COUNT VALUE ARE PERFORMED AS PART OF AN ONGOING MONITOR — 124

OR

THE DESIGNATING A FIRST CLOCK OF A PLURALITY OF CLOCKS AS A REFERENCE CLOCK, THE PROVIDING A REFERENCE CLOCK COUNTER, THE PROVIDING A COUNTER FOR EACH OTHER CLOCK OF THE PLURALITY OF CLOCKS, THE STARTING THE REFERENCE CLOCK COUNTER AND EACH OF THE COUNTERS AT A SAME TIME, AND THE DETERMINING WHEN THE REFERENCE CLOCK COUNTER REACHES A MAXIMUM COUNT VALUE ARE PERFORMED AFTER A PCB FAILURE HAS OCCURRED — 126

*FIGURE 2B*

CLOCK FAULT DETECTOR

BACKGROUND

Printed Circuit Boards (PCBs) have become increasingly complex assemblies. As a result of this increased complexity, PCBs are difficult to analyze in case of a failure. Part of this is due to the fact that a PCB can contain several devices and busses that run asynchronously with respect to each other and also run at different clock speeds. One particular type of failure that can be difficult to detect and to verify has to do with clock circuitry. This is especially true for an intermittent clock failure due to a poor connection, improper termination or a faulty device that may be slightly off frequency or has a tendency to frequency drift under certain conditions (temperature, humidity, etc).

One way to attempt to diagnose these clock failures is to use a frequency counter, but unless the frequency counter is being employed at the time the failure occurs, detection of a failure can be difficult. Use of an oscilloscope or other type of measuring device also may not provide the level of precision required to determine if a clock circuit occasionally drops a cycle or drifts off frequency for a period of time or under certain conditions.

SUMMARY

Conventional mechanisms such as those explained above suffer from a variety of deficiencies. The presently described clock fault detector provides a method and apparatus to monitor and detect clock instabilities and errors that are hard to detect and determine while testing PCB assemblies or while the PCB is running in a system.

During the product design cycle, the clocks generated by oscillators, logical elements, or synthesizers may not operate as desired, and as a result an engineer or technician may waste a lot of time debugging the problem, often overlooking this possible source of failure. This presently described clock fault detector provides a mechanism for detecting many clocking failures.

During the manufacturing process, occasionally a single board will have a problem with a clock (dropped cycles, irregular frequency, poor termination match, etc.) and be difficult to trouble shoot. This presently described clock fault detector allows easy clock failure detection for a large range of failure modes.

In a particular embodiment of a method for performing clock fault detection, a first clock of a plurality of clocks on a printed circuit board (PCB) is designated as a reference clock. A reference clock counter is in communication with the reference clock, counting cycles of the reference clock. A counter is provided for each other clock of the plurality of clocks, each counter counting cycles of a respective clock. The reference clock counter and each of the counters are started at a same time. When the reference clock counter reaches a maximum count value the value of each of the counters is stored and a determination is made whether the stored values are expected values. When a stored value is different than an expected value, an error condition is indicated and the failing count register value is saved to aid in diagnosis of the clock fault.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 2A and 2B comprises a flow diagram of a particular embodiment of a method for performing clock fault detection in accordance with embodiments of the invention.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

This design provides a method of continuously monitoring the "health" of multiple clocks in a logical circuit design, during manufacturing test, design verification, or during run time operating conditions.

PCB designs typically use multi-phased and multi-frequency clocks in designs that use programmable logic devices. The presently described clock fault detector takes advantage of lowering cost of pins on programmable logic devices, and their unused I/O pins commonly left over after a design is firmed up. By routing copies of the active clocks into one or more ASIC programmable devices, and implementing this patent design, most clock issues can be readily detected and the fault isolated. While the use of existing devices is described, it should be appreciated that separate circuitry could be used to provide clock fault detection as well.

In a particular embodiment multiple clocks are connected to a device (e.g. an Application Specific Integrated Circuit or ASIC). One of the clocks is designated as the reference clock. All the clocks continuously increment their respective internal up-count registers (one per clock source). The up-counters roll over when their maximum count is reached. When the reference clock reaches it's maximum count, all count registers register their respective counter values. Also, when the maximum count is reached, all registers reset and then start up-counting again.

Comparator logic checks each count register to be sure the count falls between pre-set high and low register values, indicating that the clocks are stable and no missing or multiple clocks have occurred.

The high and low register values can be written and read by a host processor. The correct values for these registers can be determined by examining the values across a few known good boards and determining the values empirically (include additional margin if necessary).

Figure 1:
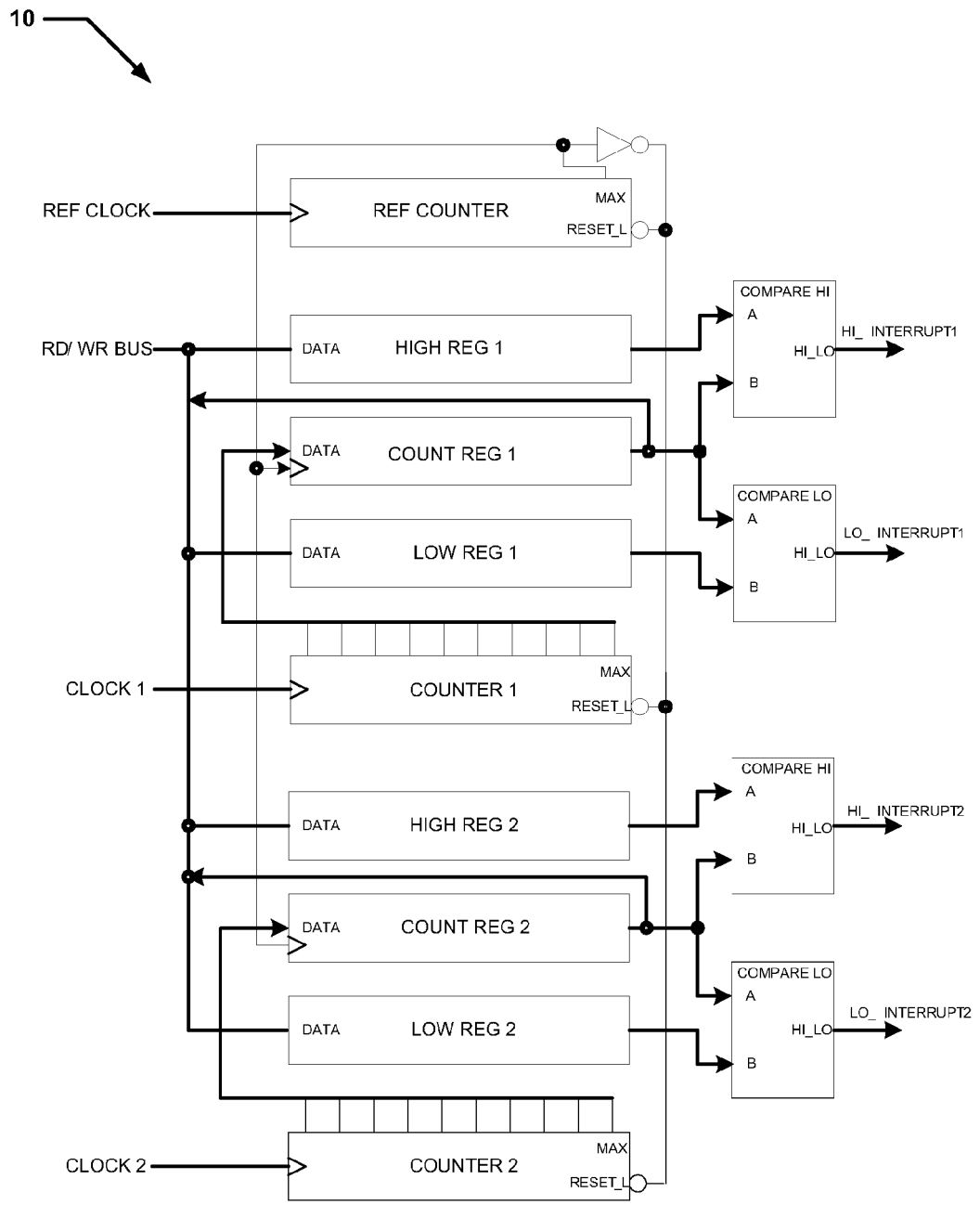
FIG. 1 comprises a block diagram of a clock fault detector in accordance with embodiments of the invention.

Referring now to FIG. 1, a particular embodiment of a clock fault detector 10 is shown. The clock fault detector is comprised of a combination of counters, registers, and comparators. In this example, a reference clock (REF CLOCK) is the master clock. The value of REF CLOCK can be any value, larger or smaller frequency than the other clocks. The reference clock may be an existing clock or may be a clock solely used for the cock fault detector. While two clocks are shown (along with the reference clock) it should be appreciated that any number of clocks and corresponding counters, registers and comparators can be used.

In operation, the clocks are free running, and increment the respective counters every clock cycle. When the REF COUNTER reaches the maximum count, all count registers (COUNT REG 1, COUNT REG 2, ...) are loaded with the values in their corresponding up-counters. The value of COUNTER 1 is loaded into COUNT REG 1 and the value of COUNTER 2 is loaded into COUN REG 2.

The value in COUNT REG 1 is compared to the value in HIGH REG 1 and LOW REG 1 by the respective compare hi and compare lo comparators. If the COUNT REG 1 value is too high or two low an interrupt will be triggered, subsequent counting in this register will freeze, and the value can be read by the local host processor for analysis.

Similarly, the value in COUNT REG 2 is compared to the value in HIGH REG 2 and LOW REG 2 by the respective compare hi and compare lo comparators. If the COUNT REG 2 value is too high or two low an interrupt will be triggered, subsequent counting in this register will freeze, and the value can be read by the local host processor for analysis.

Many instances of up-counter, count register, high reg, low reg, and comparators can be designed into a programmable chip, one for each clock source. The logic designer can iterate on the values captured in the COUNT REG to determine a safe value to write into the HIG REG and LOW REG for each clock. The spread in values will account for difference in pulses per minute (PPM) clock accuracy, and metastable edge capture when the maximum count is reached. This design will save debug time for new product in a lab undergoing design validation testing. Putting this "automatic detect" logic in place within a design will flag most clock assembly errors or component errors.

This design could be turned into a logic chip and designed as a stand-alone clock monitoring device. It could have a very low pin count, be small in size, and accessible to the host processor through an I2C bus. The clock fault detector can have different modes of operation. The clock fault detector can be used as a manufacturing test tool only, and disabled when the PCB is running in a system. This may be done to save power or reduce load on a clock. Alternately, the clock fault detector can be enabled to run at all times (clock monitor) or can be enabled only after an error has occurred.

In a particular example, the reference clock (ref clock) is running at a frequency of 250 Mhz, and two clocks, clock 1 and clock 2, are being evaluated. Clock 1 is running at 100 Mhz and clock 2 is running at 400 Mhz. Registers high reg 1, low reg 1, high reg 2 and low reg 2 are loaded with values. In his example high reg 1 is loaded with the value 7777000F, low reg 1 with the value 77770000, high reg 2 with the value AAAAAAAF and low reg 2 with the value AAAAAAA0.

The reference counter (ref counter), counter 1 and counter 2 all start at the same time. In this sense the clock counting is synchronized. After a first period of time, counter 2 will reach its maximum value, since it is clocking faster than ref counter and counter 1. Counter 2 will roll over, and continue counting again from zero. After a second period of time, ref counter will reach its maximum value. When this occurs several things happen. First, count reg 1 will be loaded with the current value of counter 1 and count reg 2 will be loaded with the current value of counter 2. In this example, count reg 1 is loaded with a value of 77770007 and count reg 2 is loaded with the value AAAAAA00.

There are high and low comparators for each clock counter. In this example the value of count reg 1 (77770007) is compared to the value of high reg 1 (7777000F), since the value of count reg 1 is lower the value of high reg 1, there is no error. The value of count reg1 (77770007) is compared to the value of low reg 1 (77770000), since the value of count reg 1 is higher the value of low reg 1, there is no error.

Also in this example the value of count reg 2 (AAAAAA00) is compared to the value of high reg 2 (AAAAAAAF), since the value of count reg 2 is lower the value of high reg 2, there is no error. The value of count reg 2 is compared to the value of low reg 1 (AAAAAAA0), since the value of count reg 2 is less the value of low reg 2, the comparator will indicate an error by generating a LO_INT-ERRUPT2 signal. A user can look at the value of the count reg 2 and see that some clock cycles have been dropped. The user can then try to troubleshoot the clock 2 circuitry to determine the cause of this error. Then ref counter, count reg 1 and count reg 2 will be reset and start counting from zero.

Figure 2A:
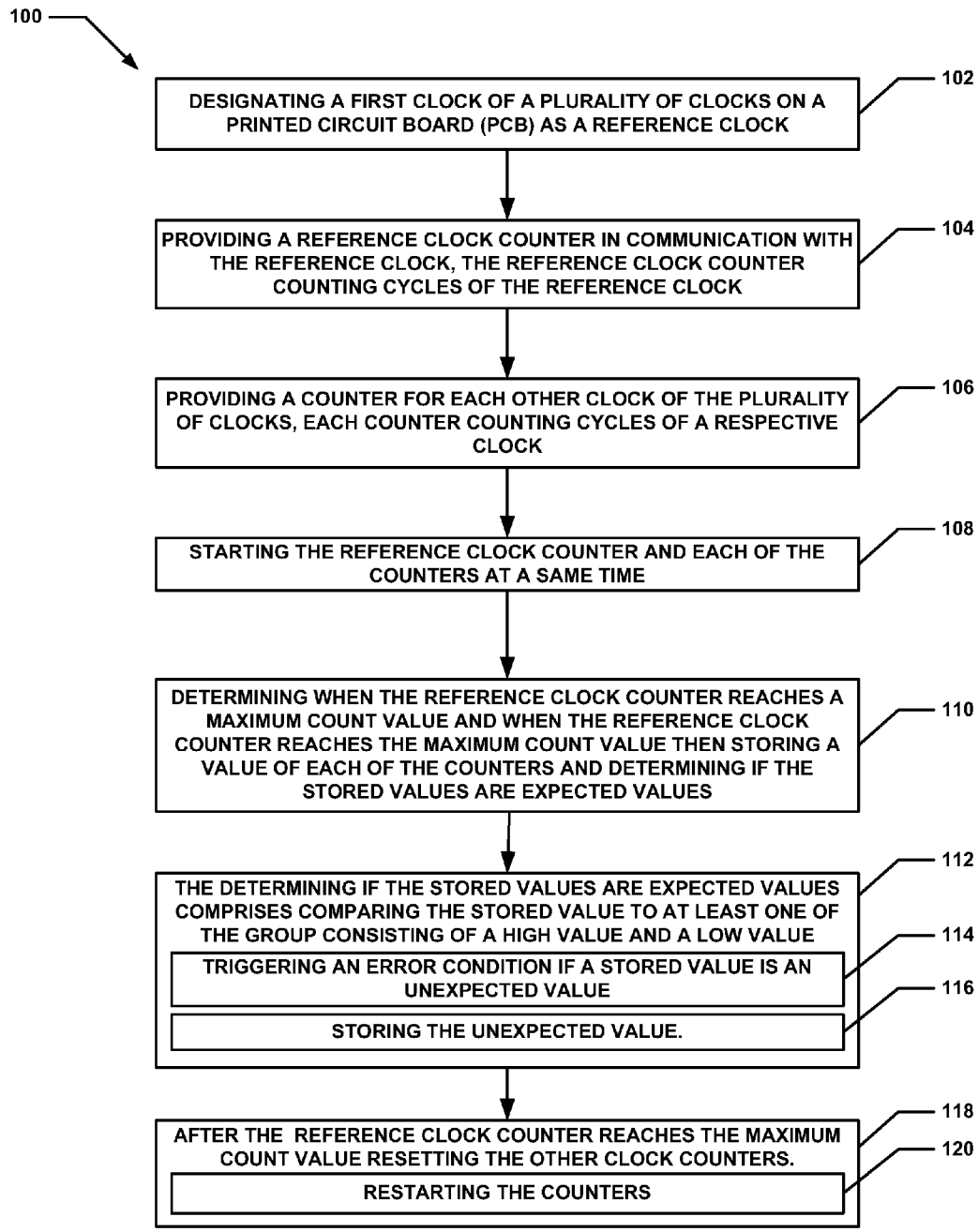

A flow chart of the presently disclosed method is depicted in FIGS. 2A and 2B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2b, a particular embodiment of a method 100 for providing clock fault detection is shown. Method 100 begins with processing block 102 which discloses designating a first clock of a plurality of clocks on a printed circuit board (PCB) as a reference clock. This clock is the clock that other clocks will be measured against. The reference clock may be a clock used for other functions on the PCB or maybe a clock dedicated for providing clock fault detection.

Processing block 104 states providing a reference clock counter in communication with the reference clock, the reference clock counter counting cycles of the reference clock. Processing block 106 recites providing a counter for each other clock of the plurality of clocks, each counter counting cycles of a respective clock.

Processing block 108 discloses starting the reference clock counter and each of the counters at a same time. This is done to keep the clocks synchronized as far as all the clocks having a common reference point.

Processing block 110 states determining when the reference clock counter reaches a maximum count value and when the reference clock counter reaches the maximum count value then storing a value of each of the counters and determining if the stored values are expected values. When the reference clock reaches its maximum count, a check is made on the remaining clocks. The values are stored and will be used to verify correct operation of the clock circuitry.

Processing continues with processing block 112 wherein the determining if the stored values are expected values comprises comparing the stored value to at least one of the group consisting of a high value and a low value. The high value and low value define acceptable limits for the clock counter value. If the clock is running too fast the high limit will be exceeded. If the clock is running too slow or dropping cycles, the low limit will not be met.

Processing block 114 states triggering an error condition if a stored value is an unexpected value. This is to notify the user of a clock fault condition. As shown in processing block 116, the unexpected value is stored. This is done to aid in troubleshooting the clock fault. For example, if the stored value is only slightly above the high limit or below the low limit, this may be due to a termination problem. On the other hand if the stored value is greatly above the high limit or below the low limit, this may be due to an incorrect component or the like.

Processing block 118 recites, after the reference clock counter reaches the maximum count value resetting the other clock counters. As shown in processing block 120, the counters are then restarted. This is done to keep the common reference point of the counters intact.

Referring to FIG. 2B, there are several different modes the clock fault detection circuit can operate in. As shown in processing block 122, one mode is wherein the designating a first clock of a plurality of clocks as a reference clock, the providing a reference clock counter, the providing a counter for each other clock of the plurality of clocks, the starting the reference clock counter and each of the counters at a same time, and the determining when the reference clock counter reaches a maximum count value are performed during manufacturing test. After the PCB is assembled, as part of the initial testing of the PCB the clock fault detection circuit is enabled to determine if the clocks are operating properly. When the manufacturing tests are done, the clock fault detection circuit may be disabled.

Processing block 124 discloses another mode the clock fault detection circuitry can be used in. This processing block discloses wherein the designating a first clock of a plurality of clocks as a reference clock, the providing a reference clock counter, the providing a counter for each other clock of the plurality of clocks, the starting the reference clock counter and each of the counters at a same time, and the determining when the reference clock counter reaches a maximum count value are performed as part of an ongoing monitor. The circuit is continually employed and provides a monitoring of the clock circuits at all times.

Processing block 126 discloses another mode the clock fault detection circuitry can be used in. This processing block discloses wherein the designating a first clock of a plurality of clocks as a reference clock, the providing a reference clock counter, the providing a counter for each other clock of the plurality of clocks, the starting the reference clock counter and each of the counters at a same time, and the determining when the reference clock counter reaches a maximum count value are performed after a PCB failure has occurred. Under non-error conditions, the clock fault circuitry is not enabled. After an error has occurred (not necessarily a clock related error), the clock fault circuitry is enabled to determine if the error was due to clock circuitry.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method in which a computer system performs operations comprising:
    designating by said computer system a first clock of a plurality of clocks on a printed circuit board (PCB) as a reference clock;
    providing by said computer system a reference clock counter in communication with said reference clock, said reference clock counter counting cycles of said reference clock;
    providing by said computer system a counter for each other clock of said plurality of clocks, each counter counting cycles of a respective clock;
    starting by said computer system said reference clock counter and each of said counters at a same time; and
    determining by said computer system when said reference clock counter reaches a maximum count value and when said reference clock counter reaches said maximum count value then storing by said computer system value of each of said counters and determining by said computer system if said stored values are expected values.

2. The method of claim 1 wherein said determining by said computer system if said stored values are expected values comprises comparing by said computer system said stored value to at least one of the group consisting of a high value and a low value.

3. The method of claim 2 further comprising triggering by said computer system an error condition if a stored value is an unexpected value.

4. The method of claim 2 further comprising storing by said computer system said unexpected value.

5. The method of claim 1 further comprising, after said reference clock counter reaches said maximum count value resetting by said computer system said other clock counters.

6. The method of claim 5 further comprising restarting by said computer system said counters.

7. The method of claim 1 wherein said designating by said computer system a first clock of a plurality of clocks as a reference clock, said providing by said computer system a reference clock counter, said providing by said computer system a counter for each other clock of said plurality of clocks, said starting by said computer system said reference clock counter and each of said counters at a same time, and said determining by said computer system when said reference clock counter reaches a maximum count value are performed during manufacturing test.

8. The method of claim 1 wherein said designating by said computer system a first clock of a plurality of clocks as a reference clock, said providing by said computer system a reference clock counter, said providing by said computer system a counter for each other clock of said plurality of clocks, said starting by said computer system said reference clock counter and each of said counters at a same time, and said determining by said computer system when said reference clock counter reaches a maximum count value are performed as part of an ongoing monitor.

9. The method of claim 1 wherein said designating by said computer system a first clock of a plurality of clocks as a reference clock, said providing by said computer system a reference clock counter, said providing by said computer system a counter for each other clock of said plurality of clocks, said starting by said computer system said reference clock counter and each of said counters at a same time, and said determining by said computer system when said reference clock counter reaches a maximum count value are performed after a PCB failure has occurred.

10. An apparatus comprising:
    a reference counter in communication with a reference clock;
    at least one clock verification circuit in communication with a respective clock; and
    wherein said reference counter and said at least one clock verification circuit start counting at a same time and wherein when said reference counter reaches a maximum count said clock verification circuit saves a value of a clock counter.

11. The apparatus of claim 10 further comprising wherein said clock verification circuit determines if said saved value is an expected value.

12. The apparatus of claim 10 wherein said clock verification circuit comprises:
    a clock counter in communication with an input clock;
    a counter register in communication with said clock counter; and
    a comparison circuit in communication with said counter register.

13. The apparatus of claim 12 wherein said comparison circuit comprises:
    a high count register containing a maximum expected count value for said counter register; and
    a high count comparator in communication with said high count register and said counter register.

14. The apparatus of claim 13 wherein said comparison circuit comprises:
    a low count register containing a minimum expected count value for said counter register; and
    a low count comparator in communication with said low count register and said counter register.

15. The apparatus of claim 14 wherein when said counter value exceeds said maximum expected count or is below said minimum expected count an error condition is indicated.

16. The apparatus of claim 12 wherein after said reference clock counter reaches said maximum count, said clock counter is reset.

17. The apparatus of claim 16 wherein after said clock counter is reset, said clock counter starts counting again.

* * * * *